(12) United States Patent
Kim (10) Patent No.: US 9,109,920 B2
(45) Date of Patent: Aug. 18, 2015

(54) METHOD AND APPARATUS FOR DISPLAYING OPTIMAL PATH OF MOVING OBJECTS IN A NAVIGATION DEVICE

(75) Inventor: Jong-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 2016 days.

(21) Appl. No.: 12/197,829

(22) Filed: Aug. 25, 2008

(65) Prior Publication Data

US 2009/0063046 A1    Mar. 5, 2009

(30) Foreign Application Priority Data

Aug. 23, 2007    (KR) .................. 10-2007-0085121

(51) Int. Cl.
*G01C 21/36*    (2006.01)

(52) U.S. Cl.
CPC .................. *G01C 21/3667* (2013.01)

(58) Field of Classification Search
CPC .................................. G01C 21/3667
USPC ...................... 701/211; 340/995.19
See application file for complete search history.

(56) References Cited

U.S. PATENT DOCUMENTS

| | | | | |
|---|---|---|---|---|
| 5,612,881 A * | 3/1997 | Moroto et al. | ................ | 701/209 |
| 5,832,406 A * | 11/1998 | Iwami et al. | ................ | 701/202 |
| 6,088,652 A * | 7/2000 | Abe | ................ | 701/208 |
| 6,202,026 B1 * | 3/2001 | Nimura et al. | ................ | 701/211 |
| 6,904,360 B2 * | 6/2005 | Pechatnikov et al. | ......... | 701/208 |
| 6,965,827 B1 * | 11/2005 | Wolfson | ................ | 701/207 |
| 7,031,832 B2 * | 4/2006 | Kawasaki et al. | ............. | 701/210 |
| 7,047,129 B2 * | 5/2006 | Uotani | ................ | 701/200 |
| 7,177,761 B2 * | 2/2007 | Kaufman et al. | ............. | 701/211 |
| 7,353,110 B2 * | 4/2008 | Kim | ................ | 701/211 |
| 7,395,152 B2 * | 7/2008 | Watanabe et al. | ............. | 701/209 |
| 7,519,470 B2 * | 4/2009 | Brasche et al. | ............... | 701/207 |
| 7,627,420 B2 * | 12/2009 | Ujino | ................ | 701/200 |
| 2002/0049534 A1 | 4/2002 | Yuda et al. | | |
| 2002/0188400 A1 * | 12/2002 | Sato et al. | ................ | 701/212 |
| 2004/0181337 A1 * | 9/2004 | Kawasaki et al. | ............. | 701/209 |
| 2005/0278111 A1 * | 12/2005 | Ujino | ................ | 701/200 |
| 2006/0089798 A1 * | 4/2006 | Kaufman et al. | ............. | 701/211 |
| 2006/0142941 A1 * | 6/2006 | Imai et al. | ................ | 701/211 |
| 2007/0005233 A1 * | 1/2007 | Pinkus et al. | ................ | 701/200 |

(Continued)

FOREIGN PATENT DOCUMENTS

| | | |
|---|---|---|
| CN | 1724976 | 1/2006 |
| EP | 0 636 863 | 2/1995 |
| JP | 2003-232648 | 8/2003 |

(Continued)

*Primary Examiner* — Stanton L Krycinski
(74) *Attorney, Agent, or Firm* — The Farrell Law Firm, P.C.

(57) ABSTRACT

A method and apparatus for displaying an optimal path of moving objects, capable of providing forward path information of while the vehicle is waiting for its traffic signal at an intersection or is in a standstill state, in a navigation device are provided. An optimal path is set and stored according to a destination of a moving object. A current position of the moving object traveling along the optimal path is detected. When the moving object stops on the optimal path, it is determined if a traveling-stopped time of the moving object is greater than or equal to a predetermined time. When the traveling-stopped time of the moving object is greater than or equal to the predetermined time, a forward path for the detected current position of the moving object is displayed.

20 Claims, 6 Drawing Sheets

(56) References Cited

U.S. PATENT DOCUMENTS

2007/0078599 A1* 4/2007 Yoshioka et al. ............ 701/211
2010/0185386 A1    7/2010 Hess

FOREIGN PATENT DOCUMENTS

WO    WO 2005121707 A2  * 12/2005
WO    WO 2008/154891        12/2008

* cited by examiner

METHOD AND APPARATUS FOR DISPLAYING OPTIMAL PATH OF MOVING OBJECTS IN A NAVIGATION DEVICE

PRIORITY

This application claims priority under 35 U.S.C. §119(a) to a Korean Patent Application filed in the Korean Intellectual Property Office on Aug. 23, 2007 and assigned Serial No. 2007-85121, the disclosure of which is incorporated herein by reference.

BACKGROUND OF THE INVENTION

1. Field of the Invention

The present invention relates generally to a method and apparatus for displaying an optimal path of moving objects in a navigation device, and more particularly, to a method and apparatus for displaying an optimal path of moving objects, capable of providing forward path information while the vehicle is waiting for its traffic signal at an intersection or is in a standstill state, in a navigation device.

2. Description of the Related Art

The popularization of mobile communication terminals has facilitated the supply of various services such as Traffic Information Service capable of providing road condition information through a screen of the mobile communication terminal while the user is driving, My Bell Service by which the user can register his/her own unique bell sounds, Mobile Paging Service for notifying an arrival of messages at a voice mail box by characters, etc.

A mobile communication terminal with a Global Positioning System (GPS) function realized therein calculates the current position of the vehicle using the GPS and provides a navigation service according to the position information. The 'navigation service' refers to a service that provides the current position information of the vehicle, and calculates the optimal path up to the desired destination to show the calculated path during driving of the vehicle, thereby guiding the driver.

The navigation device may have a path preview function to provide the user with a preview of the entire path from the starting point through the destination. However, for the preview function of the vehicle navigation device, the driver must annoyingly enter commands on a manual basis. In addition, the navigation device always performs the preview function on the entire path from the starting point through the destination regardless of the current position of the driver. Therefore, the driver may have difficulty in finding the current position of the vehicle on the preview screen, and may feel confused because the user has no path information of the direction toward which he/she should advance.

SUMMARY OF THE INVENTION

The present invention has been made to address at least the above problems and/or disadvantages and to provide at least the advantages described below. Accordingly, an aspect of the present invention provides a method and apparatus for displaying an optimal path of moving objects, capable of providing forward path information while the vehicle is waiting for its traffic signal at an intersection or is in a standstill state, in a navigation device.

According to one aspect of the present invention, a method is provided for displaying an optimal path of a moving object in a navigation device. An optimal path is set and stored according to a destination of a moving object. A current position of the moving object traveling along the optimal path is detected. It is determined if a traveling-stopped time of the moving object is greater than or equal to a predetermined time, when the moving object stops traveling on the optimal path. A forward path for the detected current position of the moving object is displayed, when the traveling stopped time of the moving object is greater than or equal to the predetermined time.

According to another aspect of the present invention, a method is provided for displaying an optimal path of a moving object in a navigation device. An optimal path is set and displayed according to a destination of a moving object. A current position of the moving object traveling on the optimal path is detected. It is determined if a user input for display of a forward path is received, when the moving object stops during its travel on the optimal path. Upon receiving the user input for display of the forward path, displaying the forward path for the current position of the moving object.

According to a further aspect of the present invention, a method is provided for displaying an optimal path of a moving object in a navigation device. An optimal path is set and displayed according to a destination of a moving object. A current position of the moving object traveling on the optimal path is detected. It is determined if a first intersection is situated within a predetermined first scope from the detected current position of the moving object, when the moving object stops during its travel on the optimal path. It is determined if a second intersection is situated within a predetermined second scope, when the first intersection is situated within the predetermined first scope. A forward path for the current position of the moving object is displayed, including the first intersection and the second intersection, when the second intersection is situated within the predetermined second scope.

According to an additional aspect of the present invention, an apparatus is provided for displaying an optimal path of a moving object in a navigation device. The apparatus includes a map data database (DB) for storing map data used for providing an optimal path based on a destination of a moving object, and a position detector for detecting a current position of the moving object traveling along the optimal path. The apparatus also includes a display for displaying the optimal path and the current position of the moving object. The apparatus further includes a controller for setting the optimal path using the map data, determining if a traveling-stopped time is greater than or equal to a predetermined time when the moving object stops during its traveling on the optimal path, and controlling the display to display a forward path for the current position of the moving object when the traveling-stopped time is greater than or equal to the predetermined time.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention are described in detail with reference to the accompanying drawings. In the drawings, the same or similar elements are denoted by the same or similar reference numerals even though they are depicted in different drawings. Detailed descriptions of constructions or processes known in the art may be omitted to avoid obscuring the subject matter of the present invention.

In displaying an optimal path from the starting point through the destination of a moving object, the navigation device according to the present invention displays map data including the current position of the moving object traveling on the optimal path, and an optimal path associated with the current position. The displayed map data including the optimal path is map data for the area within a predetermined scope (or distance) from the current position of the moving object. The area within a predetermined scope, defined on the basis of the current position, will be referred to herein as a 'current traveling area'.

The area within a predetermined scope, including the optimal path, selected from the entire optimal path, through which the moving object should travel after traveling the current traveling area will be referred to herein as a 'forward area'. For example, if the current traveling area is defined as a circular area within 150 meters from the current position of the moving object, the forward area can be defined as a circular area within 250 meters outside the boundary of the circular 150-meter area based on the current position of the moving object.

The term 'forward path' as used herein refers to an optimal path belonging to the forward area in the entire optimal path. The term 'forward path preview' as used herein refers to an operation of providing information on the optimal path through which the moving object should travel from now on, by displaying the forward path belonging to the forward area on the display screen.

Figure 1:
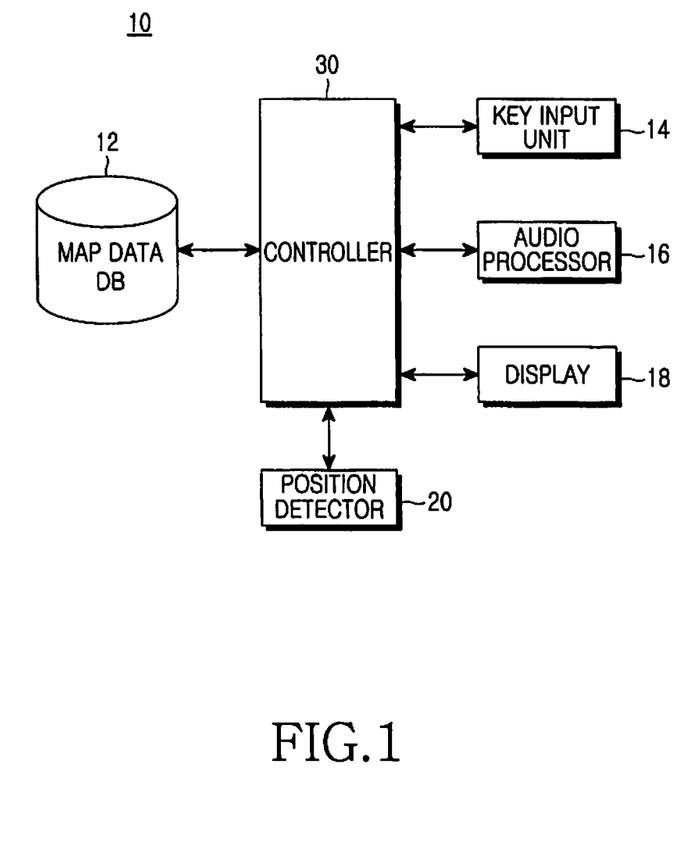
FIG. 1 is a block diagram illustrating a schematic structure of an apparatus for displaying an optimal path of a moving object in a navigation device according to an embodiment of the present invention.

FIG. 1 is a block diagram illustrating a schematic structure of an apparatus for displaying an optimal path of a moving object in a navigation device according to an embodiment of the present invention.

A navigation device 10 includes a map data database (DB) 12, a key input unit 14, an audio processor 16, a display 18, a position detector 20, and a controller 30.

The map data DB 12 stores map data used for providing an optimal path of a moving object to a user. The map data DB 12, according to an embodiment of the present invention, stores map data by which the controller 30 will display the forward path when the moving object stops during its travel.

The key input unit 14 includes keys by which the navigation device 10 can receive numerical and character inputs, and keys used for setting various functions. The key input unit 14 receives inputs from the user by means of the keys included therein. The key input unit 14, according to an embodiment of the present invention, receives a destination input from the user. In addition, the key input unit 14 receives from the user a user input indicating whether the user intends to display the optimal path on the display 18.

The key input unit 14 receives a user input as to whether the user intends to activate the forward path preview function. Preferably, the key input unit 14 may include a hot key used for immediately executing the forward path preview function of displaying the forward path on the display screen. In addition, the key input unit 14 may receive a user input for defining a scope of the forward area. For example, with use of the key input unit 14, the user may request the navigation device 10 to display the area within a 200-meter scope in the forward path.

The display 18, which can be composed of a Liquid Crystal Display (LCD), outputs various display data generated by the navigation device 10. When the LCD is realized in a touch screen manner, the display 18 may serve even as an input means. The display 18, according to the present invention, displays an optimal path from the starting point through the destination of the moving object.

Upon receiving a user input for the forward path preview function through the key input unit 14, the display 18, according to the present invention, displays the forward path under the control of the controller 30. Further, the display 18 can perform the forward path preview function in the manner of simulating how the moving object travels on the forward path on the display screen.

The audio processor 16 processes audio data generated by the navigation device 10. The audio processor 16 outputs voice data to provide optimal path information of the moving object. For example, when the moving object finds a pedestrian crossing existing 25 meters in forward while traveling along the optimal path, the audio processor 16 may output a voice information 'There is a crosswalk 25 meters in forward'.

The position detector 20 detects the current position of the moving object on which the navigation device 10 is mounted. To this end, the position detector 20 may include a GPS receiver. The GPS receiver receives GPS signals transmitted from a plurality of GPS satellites, and calculates the current position of the navigation device 10 mounted on the moving object. Further, the position detector 20 calculates the information necessary for traveling of the moving object, such as the current position of the moving object calculated by means of the GPS receiver, a moving velocity and a traveling direction of the moving object, etc.

The controller 30 controls the overall operation of the navigation device 10. The controller 30 sets an optimal path of the moving object using the destination input through the key input unit 14 and the map data in the map data DB 12. Further, the controller 30 controls the position detector 20 to detect the current position of the moving object. The controller 30 controls the display 18 to display not only the optimal path of the moving object, but also the current position of the moving object on the optimal path. In addition, the controller 30 controls the audio processor 16 to output the audio data.

The controller 30 according to an embodiment of the present invention controls the navigation device 10 to perform the forward path preview function. Upon receiving a user input for the forward path preview through the key input unit 14, the controller 30 controls the display 18 to display the forward path based on the current position of the moving object on the optimal path, thereby performing the forward path preview function.

In addition, when the moving object stops during its traveling, the controller 30 measures the time the moving object stopped its traveling. The controller 30 determines if the traveling-stopped time is greater than or equal to a predetermined time. If the traveling-stopped time is greater than or equal to the predetermined time, the controller 30 controls the display 18 to display the forward path on the display screen. Here, the predetermined time can be a value previously stored in the navigation device 10.

When the moving object has stopped its traveling for a predetermined time or more, the controller 30 determines if a first intersection is situated within a predetermined first scope from the current position of the moving object detected by the position detector 20. If the first intersection is situated within the predetermined first scope, the controller 30 determines if a second intersection is situated within a predetermined second scope. When the moving object has stopped its traveling at an intersection to wait for a traffic signal, and when the moving object resumes its traveling along the optimal path, the navigation device 10 can inform the user that an intersection is included in the optimal path.

If the second intersection is situated within the predetermined second scope, the display 18 displays the forward path based on the current position of the moving object, including the first intersection and the second intersection. However, if no second intersection is situated within the predetermined second scope, the display 18 can display the forward path, including only the first intersection. Here, the first scope and the second scope can be either equal to or different from each other. In addition, the first scope and/or the second scope can be a value previously stored in the navigation device 10.

Figure 2:
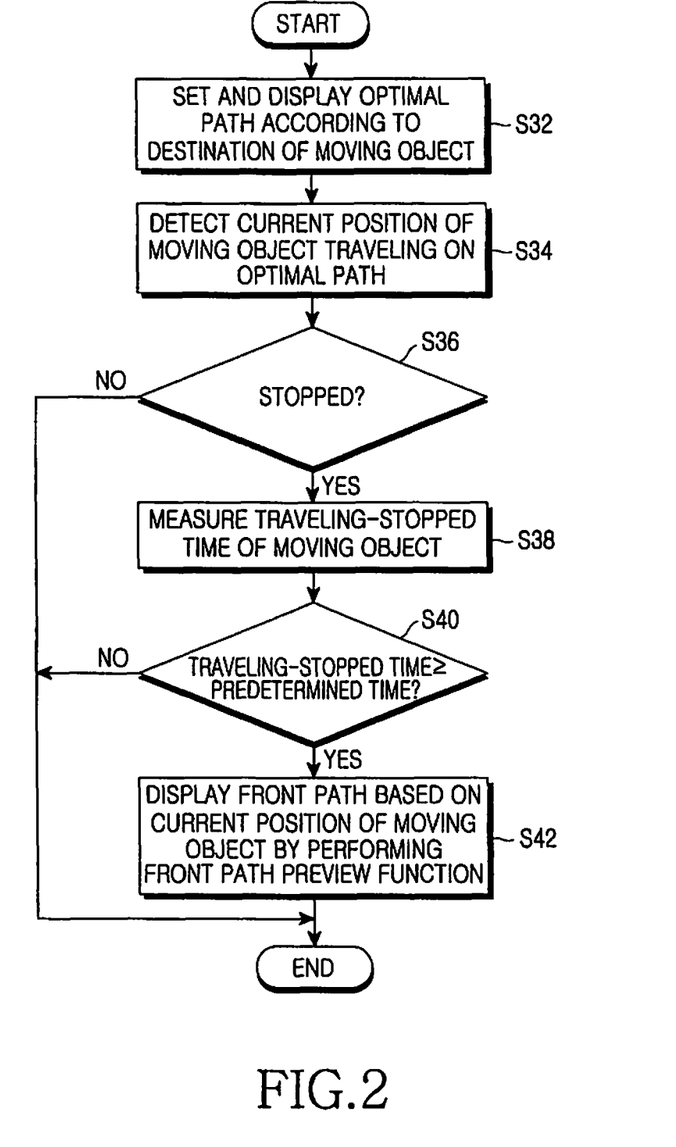
FIG. 2 is a flowchart illustrating a method for displaying an optimal path in a navigation device according to an embodiment of the present invention.

FIG. 2 is a flowchart illustrating a method for displaying an optimal path in a navigation device according to an embodiment of the present invention.

Referring to FIG. 2, the navigation device 10 sets and displays an optimal path according to the destination of the moving object (Step S32). Upon receiving a destination input from the user through the key input unit 14, the controller 30 sets an optimal path using the map data stored in the map data DB 12. When the optimal path is set, the display 18 displays on the display screen the current position of the moving object and the current traveling area including the current position of the moving object in the optimal path.

The position detector 20 detects the current position of the moving object traveling along the optimal path (Step S34). As the Current position of the moving object is detected, the controller 30 controls the display 18 to display the current traveling area for the current position of the moving object.

The controller 30 determines if the moving object has stopped on the optimal path during its traveling (Step S36). The traveling stoppage of the moving object can be detected using sensors included in the position detector 20. For example, if a value of an acceleration sensor, included in the navigation device 10, is 0, and the current position of the moving object measured with the GPS receiver has the same value for a predetermined time, the controller 30 can determine that the moving object has stopped. For example, if the traveling-stopped time of the moving object is 15 seconds, the controller 30 can determine that the moving object has stopped.

If it is determined that the moving object has not stopped its traveling (No in Step S36), the controller 30 performs no separate operation. In this case, the moving object continues to travel on the optimal path set by the controller 30. In addition, the navigation device 10 displays the optimal path up to the destination and its associated map data according to the change in position of the moving object.

However, if it is determined that moving object has stopped (Yes in Step S36), the controller 30 measures the traveling-stopped time of the moving object (Step S38). The controller 30 determines if the measured traveling-stopped time is greater than or equal to a predetermined time (Step S40). The predetermined time in step S40 can be different from the time that was set in step S36 to determine if the moving object has stopped.

If it is determined that the measured traveling-stopped time is greater than or equal to the predetermined time (Yes in Step S40), the display 18 performs the forward path preview function to display the forward path based on the current position (Step S42). As a result, when the moving object is waiting in the intersection for a long time, the user can find out the forward path of the moving object without applying any separate manipulation to the navigation device 10.

However, if it is determined that the traveling-stopped time measured by the controller 30 is not greater than or equal to the predetermined time (No in Step S40), the navigation device 10 performs no separate operation.

Figure 3:
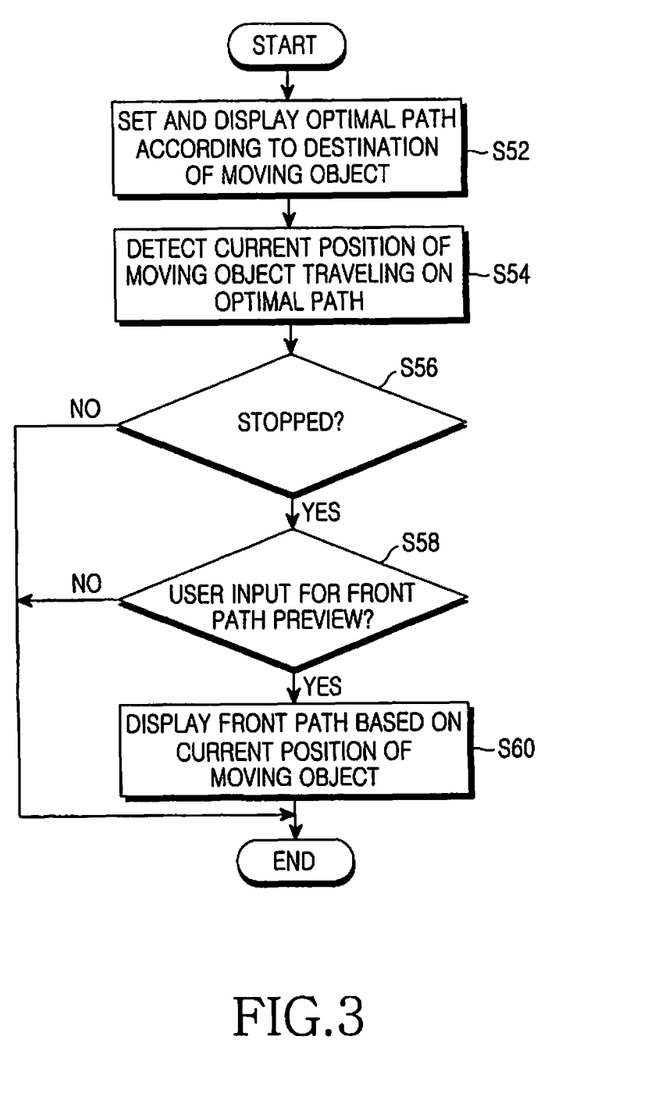
FIG. 3 is a flowchart illustrating a method for displaying an optimal path in a navigation device according to another embodiment of the present invention.

FIG. 3 is a flowchart illustrating a method for displaying an optimal path in a navigation device according to another embodiment of the present invention.

The navigation device 10 sets and displays an optimal path according to the destination of the moving object (Step S52). Upon receiving a destination input from the user through the key input unit 14, the controller 30 sets an optimal path from the starting point through the destination using the map data stored in the map data DB 12. When the optimal path is set, the display 18 displays on the display screen the current position of the moving object and the current traveling area indicative of the traveling area including the current position of the moving object in the optimal path.

The position detector 20 detects the current position of the moving object traveling on the optimal path (Step S54). In this case, the controller 30 controls the display 18 to display the current traveling area for the current position of the moving object.

The controller 30 determines if the moving object traveling on the optimal path has stopped (Step S56). If it is determined that the moving object has not stopped (No in Step S56), the controller 30 performs no separate operation.

However, if it is determined that the moving object traveling along the optimal path has stopped (Yes in Step S56), the controller 30 determines if a user input for the forward path preview has been received (Step S58). If it is determined that the user input for the forward path preview has been received (Yes in Step S58), the display 18 displays the forward path based on the current position of the moving object (Step S60). However, if it is determined that the user input for the forward path preview has not been received (No in Step S58), the navigation device 10 performs no separate operation.

Figure 4:
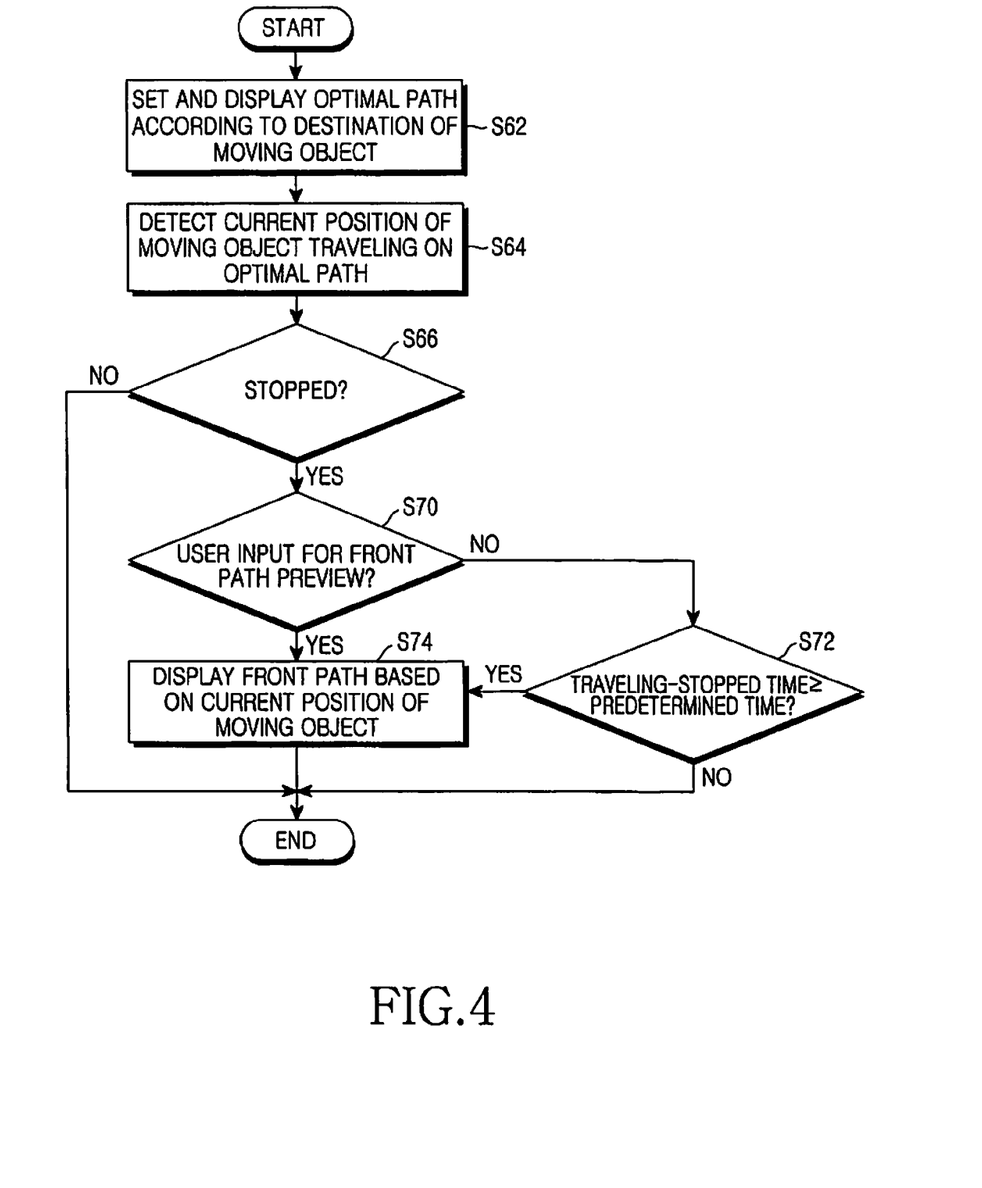
FIG. 4 is a flowchart illustrating a method for displaying an optimal path in a navigation device according to a further embodiment of the present invention.

FIG. 4 is a flowchart illustrating a method for displaying an optimal path in a navigation device according to a further embodiment of the present invention.

The navigation device 10 sets and displays an optimal path according to the destination of the moving object (Step S62). Upon receiving a destination input from the user through the key input unit 14, the controller 30 sets the optimal path using the map data stored in the map data DB 12. When the optimal path is set, the display 18 displays the current traveling area on the display screen.

The position detector 20 detects the current position of the moving object traveling on the optimal path (Step S64). As the current position of the moving object is detected, the controller 30 controls the display 18 to display the current traveling area for the current position of the moving object.

The controller 30 determines if the moving object traveling on the optimal path has stopped (Step S66). The stoppage of the moving object can be detected using the sensors included in the position detector 20.

If it is determined that the traveling moving object has not stopped (No in Step S66), the controller 30 performs no separate operation. In this case, the moving object continues to travel along the optimal path set by the controller 30.

However, if it is determined that the moving object has stopped (Yes in Step S66), the controller 30 determines if a user input for the forward path preview function has been received (Step S70).

If it is determined that the user input for the forward path preview function has been received (Yes in Step S70), the display 18 displays the forward path based on the current position of the moving object (Step S74). However, if it is determined that the user input for the forward path preview function has not been received (No in Step S70), the controller 30 determines if the traveling-stopped time of the moving object is greater than or equal to a predetermined time (Step S72). In this embodiment, when the moving object stops in step S66, the controller 30 measures the traveling-stopped time of the moving object. Therefore, the controller 30 can compare the measured traveling-stopped time with a predetermined time in Step S72.

If it is determined that the traveling-stopped time of the moving object is greater than or equal to the predetermined time (Yes in Step S72), the display 18 displays the forward path based on the current position of the moving object under the control of the controller 30 (Step S74). However, if it is determined that the traveling-stopped time of the moving object is not greater than or equal to the predetermined time (No in Step S72), the navigation device 10 performs no separate operation.

Figure 5:
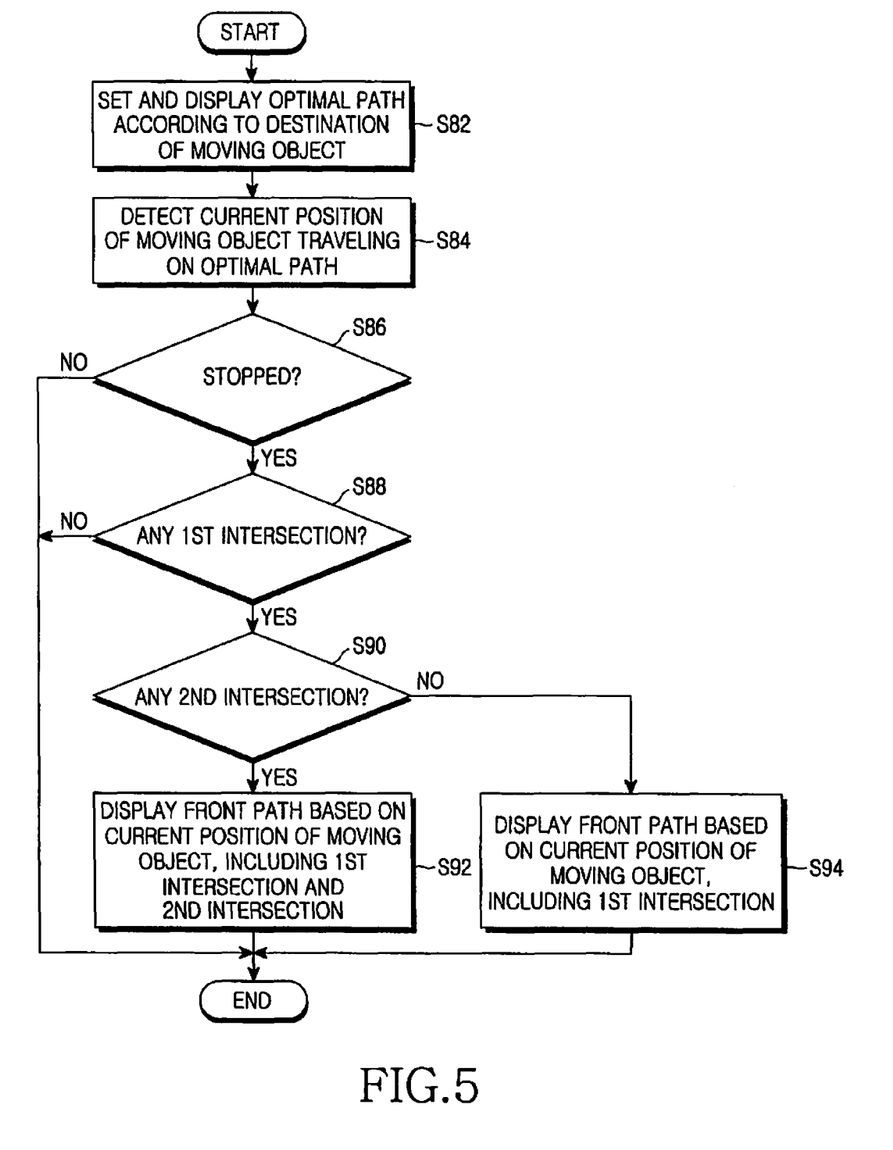
FIG. 5 is a flowchart illustrating a method for displaying an optimal path in a navigation device according to an additional embodiment of the present invention.

FIG. 5 is a flowchart illustrating a method for displaying an optimal path in a navigation device according an additional embodiment of the present invention.

The navigation device 10 sets and displays an optimal path according to the destination of the moving object (Step S82). Upon receiving a destination input from the user through the key input unit 14, the controller 30 sets the optimal path using the map data stored in the map data DB 12. When the optimal path is set, the display 18 displays on the display screen the current position of the moving object and the current traveling area including the current position of the moving object.

The position detector 20 detects the current position of the moving object traveling along the optimal path (Step S84). As the current position of the moving object is detected, the controller 30 controls the display 18 to display the current traveling area for the changing current position of the moving object.

The controller 30 determines if the moving object traveling on the optimal path has stopped (Step S86). The stoppage of the moving object can be detected using the sensors included in the position detector 20. If it is determined that the traveling moving object has not stopped (No Step S86), the controller 30 performs no separate operation. In this case, the moving object continues to travel along the optimal path set by the controller 30. As a result, the display 18 displays the current traveling area according to the changing current position of the moving object on the optimal path.

However, if it is determined that the moving object has stopped (Yes in Step S86), the controller 30 determines if a first intersection is situated within a predetermined first scope from the current position of the moving object (Step S88). If it is determined that the first intersection is not situated (No in Step S88), the navigation device 10 performs no separate operation.

However, if it is determined that the first intersection is situated in the predetermined first scope of the moving object (Yes in Step S88), the controller 30 determines if a second intersection is situated within a predetermined second scope from the first intersection (Step S90). The predetermined first scope in step S88 and the predetermined second scope in step S90 can be either equal to or different from each other. Preferably, the first intersection and the second intersection both are included in the optimal path of the moving object.

If it is determined that the second intersection is situated within the predetermined second scope (Yes in Step S90), the display 18 displays the forward path based on the current position of the moving object, including the first and second intersections (Step S92). However, if it is determined that the second intersection is not situated within the predetermined second scope (No in Step S90), the display 18 displays forward path based on the current position of the moving object, including the first intersection (Step S94).

Figure 6:
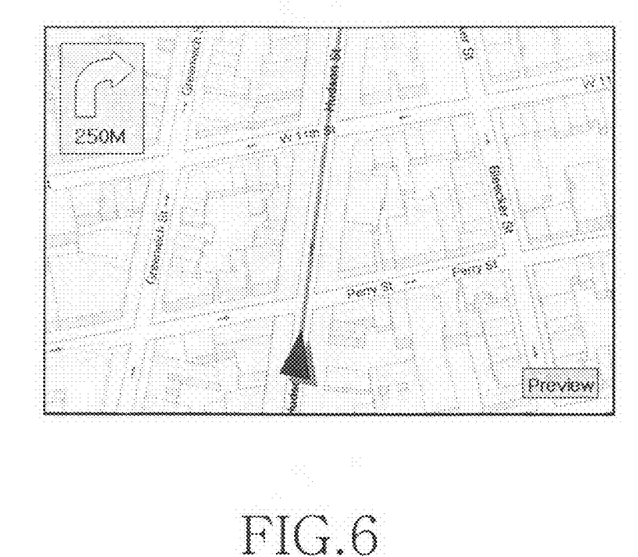
FIG. 6 is a diagram illustrating a display screen with an optimal path displayed thereon in a navigation device according to an embodiment of the present invention.

FIG. 6 is a diagram illustrating a display screen with an optimal path displayed thereon in a navigation device according to an embodiment of the present invention.

Shown in FIG. 6 is a display screen for the case where a user input for the forward path preview function is received through the key input unit 14. In FIG. 6, the display 18 displays the forward path and the forward area on the full-size display screen under the control of the controller 30.

In FIG. 6, the navigation device 10 displays the forward path within a 250-meter scope. The display 18, under the control of the controller 30, outputs a letter 'Preview' to notify the ongoing execution of the forward path preview function.

Figure 7:
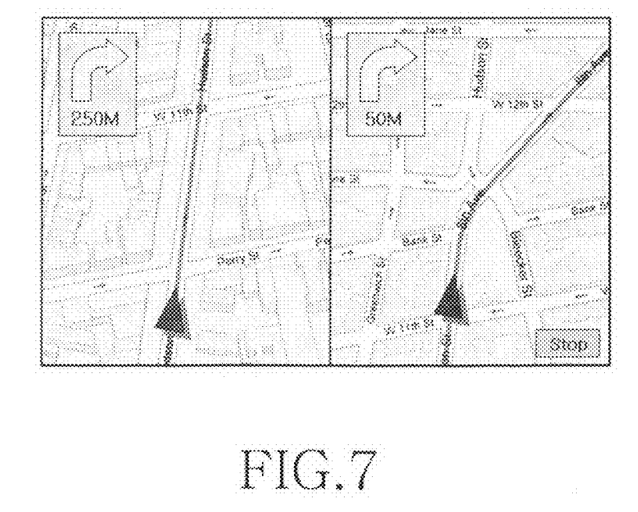
FIG. 7 is a diagram illustrating a display screen with an optimal path displayed thereon in a navigation device according to another embodiment of the present invention.

FIG. 7 is a diagram illustrating a display screen with an optimal path displayed thereon in a navigation device according to another embodiment of the present invention.

Shown in FIG. 7 is a display screen for the case where the traveling-stopped time of the moving object is greater than or equal to the predetermined time. In this case, the forward path preview function is automatically performed. The display screen is divided into two sub-screens: the left sub-screen displays the current position of the moving object on the optimal path, and the right sub-screen displays the forward path calculated by performing the forward path preview function. A letter 'Stop' is output on the right bottom of the display screen to indicate that the moving object has stopped for a predetermined time or more.

When displaying the current position of the moving object on the optimal path, the display 18 of the navigation device 10 displays the scope up to 250 meters in forward on the display screen. When the moving object has stopped for a predetermined time or more to wait for its traffic signal, the forward path preview function is performed. In this embodiment, the forward path and the forward area belong to the area within a 50-meter scope outside the current traveling area. With reference to FIG. 7, it can be appreciated that the left sub-screen displays the area up to 'W 11th St' while the right sub-screen displays the area starting from 'W 11th St'. Further, with reference to FIG. 7, as the moving object performs the forward path preview function after going straight up to 'Hudson St' on the optimal path, the user can recognize that the moving object should turn to '8th Ave'. In addition, since the user can understand that he/she should pass by 'Bank St' on the way to '8th Ave', the user can acquire the detailed information on the area before the moving object passes by the corresponding area. Therefore, the user can readily distinguish the intersection requiring rotation from the intersection requiring no rotation.

As is apparent from the foregoing description, the present invention provides a method and apparatus for displaying an optimal path of moving objects, capable of providing forward path information while the vehicle is waiting for its traffic signal at an intersection or is in a standstill state, in the navigation device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for displaying, in a navigational device, an optimal path of an object, the method comprising the steps of:
    setting and displaying an optimal path according to a destination of the object;
    detecting a current position of the object traveling along the optimal path;
    determining, while the object is stopped on the optimal path, whether a traveling-stopped time of the object is at least equal to a predetermined time; and
    displaying, upon determining that the traveling-stopped time is at least equal to the predetermined time, a forward path for the detected current position of the object,
    wherein the forward path is an optimal path in a forward area that excludes an area within a first predetermined scope from the current position of the object.

2. The method of claim 1, wherein the forward area is within a second predetermined scope from the current position of the object.

3. The method of claim 1, wherein displaying the forward path comprises displaying the object virtually traveling in the forward area.

4. The method of claim 1, wherein displaying the forward path comprises displaying the forward path on a sub-screen divided from a display screen.

5. The method of claim 1, further comprising:
    upon receiving a user input for display of the forward path, displaying the forward path for the current position of the object.

6. The method of claim 1, further comprising:
    upon receiving a user input for stopping the display of the forward path, stopping the display of the forward path of the object.

7. A method for displaying, in a navigational device, an optimal path of an object in a navigation device, the method comprising the steps of:
    setting and displaying an optimal path according to a destination of the object;
    detecting a current position of the object traveling on the optimal path;
    determining whether a user input for display of a forward path is received while the object is stopped on the optimal path; and
    upon receiving the user input for display of the forward path, displaying the forward path for the current position of the object,
    wherein the forward path is an optimal path in a forward area that excludes an area within a first predetermined scope from the current position of the object.

8. The method of claim 7, further comprising:
    measuring, if no user input requesting display of the forward path is received, a traveling-stopped time of the object; and
    displaying the forward path for the current position of the object, when the traveling-stopped time of the object is at least equal to a predetermined time.

9. The method of claim 7, wherein the forward area is within a second predetermined scope from the current position of the object.

10. The method of claim 8, wherein displaying the forward path comprises displaying the object virtually traveling in the forward area.

11. The method of claim 7, wherein displaying the forward path comprises displaying the forward path on a sub-screen divided from a display screen.

12. The method of claim 8, further comprising:
    upon receiving a user input for stopping the display of the forward path, stopping the display of the forward path of the object.

13. A method for displaying, in a navigation device, an optimal path of an object, the method comprising the steps of:
    setting and displaying an optimal path according to a destination of the object;
    detecting a current position of the object traveling on the optimal path;
    determining whether a first intersection is situated within a predetermined first scope from the detected current position of the object while the object is stopped on the optimal path;
    determining, when the first intersection is determined to be situated within the predetermined first scope, whether a second intersection is situated within a predetermined second scope; and
    displaying, when the first intersection is determined to be situated within the first scope and the second intersection is determined to be situated within the predetermined second scope, a forward path for the current position of the object, including the first intersection and the second intersection,
    wherein the forward path is an optimal path in a forward area that excludes an area within a third predetermined scope from the current position of the object.

14. The method of claim 13, further comprising:
    displaying the forward path for the current position of the object, including the first intersection, when no second intersection is situated within the predetermined second scope.

15. The method of claim 13, wherein the forward area is an area within the second predetermined scope from the current position of the object.

16. The method of claim 14, wherein displaying the forward path comprises displaying the object virtually traveling in the forward area.

17. The method of claim 16, wherein displaying the forward path comprises displaying the forward path on a sub-screen divided from a display screen.

18. The method of claim 13, further comprising:
    upon receiving a user input for display of the forward path, displaying the forward path for the current position of the object.

19. The method of claim 13, further comprising:
    upon receiving a user input for stopping the display of the forward path, stopping the display of the forward path of the object.

20. An apparatus for displaying, in a navigation device, an optimal path of an object, the apparatus comprising:

a map data DataBase (DB) for storing map data used for providing an optimal path based on a destination of the object;

a position detector for detecting a current position of the object traveling along the optimal path;

a display for displaying the optimal path and the current position of the object; and a controller for setting the optimal path using the map data, determining whether a traveling-stopped time is at least equal to a predetermined time while the object is stopped on the optimal path, and controlling the display to display a forward path for the current position of the object when the traveling-stopped time is at least equal to the predetermined time, wherein the forward path is an optimal path in a forward area that excludes an area within a first predetermined scope from the current position of the object.

* * * * *